United States Patent

Davio

[11] Patent Number: 6,161,296
[45] Date of Patent: Dec. 19, 2000

[54] ALIGNMENT DEVICE FOR USE IN WELDING

[76] Inventor: John Leon Thomas Joseph Davio, 16 Chicadee Drive, Whitecourt, Alberta, Canada, T7S 1G3

[21] Appl. No.: 09/218,797

[22] Filed: Dec. 21, 1998

[51] Int. Cl.[7] .............................. G01B 5/24; G01B 13/18; G01B 1/00; B23K 37/00

[52] U.S. Cl. ................................ 33/412; 33/529; 33/645; 228/44.5; 228/49.3; 228/212; 29/281.1; 29/282; 269/41; 269/80; 269/131

[58] Field of Search .............................. 33/412, 529, 583, 33/613, 645; 228/44.5, 49.1, 49.3, 212, 213; 269/41, 53, 80, 131; 29/281.1, 281.5, 282

[56] References Cited

U.S. PATENT DOCUMENTS

| | | | |
|---|---|---|---|
| 1,509,507 | 9/1924 | Gruenfeldt | 228/49 |
| 2,669,013 | 2/1954 | Wilson | 29/284 |
| 3,933,292 | 1/1976 | Martin | 228/212 |
| 3,966,528 | 6/1976 | Christie | 269/41 |
| 4,169,396 | 10/1979 | Astle | 269/48.1 |
| 4,216,587 | 8/1980 | Stone | 33/412 |
| 4,541,621 | 9/1985 | Amos | 269/43 |
| 4,611,743 | 9/1986 | Williams | 228/49 |
| 4,683,164 | 7/1987 | Kaulich | 428/287 |
| 5,143,410 | 9/1992 | Takikawa | 285/197 |
| 5,740,829 | 4/1998 | Jacobs et al. | 228/49.1 |

FOREIGN PATENT DOCUMENTS 2112686A 12/1981 United Kingdom ........... B23K 37/04

*Primary Examiner*—Randy W. Gibson
*Attorney, Agent, or Firm*—Christensen O'Connor Johnson Kindness PLLC

[57] ABSTRACT

An alignment device for use in welding which includes a saddle style support which rests upon a first pipe. A second pipe is clamped to the saddle style support in an orientation substantially perpendicular to the first pipe upon which the saddle style support rests. The second pipe serves as a carrier member of a fitting, such as a weldolet. Cinch straps can be used with the saddle style support to facilitate welding on the underside of horizontal pipes or on vertical pipes.

6 Claims, 5 Drawing Sheets

ALIGNMENT DEVICE FOR USE IN WELDING

FIELD OF THE INVENTION

The present invention relates to an alignment device for use in welding and, in particular, welding a weldolet onto a pipe or an elbowlet onto a bend or elbow.

BACKGROUND OF THE INVENTION

Maintaining proper alignment can be a problem when welding a weldolet over an opening in a pipe. The weldolet must be centered over the opening, gapped an appropriate distance from the pipe and made plumb on both "X" and "Y" axes. When an operator attempts to accomplish this without the use of an alignment device, he has poor control over his equipment and inadvertent or poorly positioned arc strikes can damage the workpiece.

U.S. Pat. No. 4,611,743 which issued to Williams in 1986 discloses a device for aligning a weldolet. The device includes a frame having vertical bars which clamp on either side of a pipe. Extendible guide members are located in a substantially horizontal orientation within slots in the bars. The guide members slide along the slots and can be locked in a desired vertical position. By extending the guide members, the guide members engage a weldolet to support it about either an X or Y axis. The weldolet is supported about the other X or Y axis by means of spacers which are intended to be removed after the weldolet has been tack welded.

SUMMARY OF THE INVENTION

What is required is an alternative configuration of alignment device for use when welding in the field.

According to the present invention there is provided an alignment device for use in welding which includes a saddle style support. The support rests upon a curved workpiece, such as a first pipe. Means is provided for clamping an elongate carrier member, such as a second pipe, to the saddle style support in an orientation substantially perpendicular to the curved workpiece upon which the saddle style support rests. The second pipe carries a fitting, such as a weldolet, during tack welding.

The alignment device, as described above, is simple in construction. A weldolet or elbowlet is attached to the second pipe. The second pipe is then clamped in place with the required gap prior to welding. The alignment device holds the second pipe in a perpendicular orientation relative to the first pipe while tack welding is completed. The likelihood of inadvertent or poorly positioned arc strikes is reduced, if not entirely eliminated, as the operator has the use of both hands which permits him to have better control over his equipment.

Although beneficial results may be obtained through the use of the alignment device, as described above, a superior alignment is obtained when the saddle style support is level. Even more beneficial results may, therefore, be obtained when level.indicator means, such as a spirit level, are built into the saddle style support.

Although beneficial results may be obtained through the use of the alignment device, as described above, safety considerations are always paramount. Unless appropriate steps are taken to electrically isolate the workpiece from the saddle style support, there is a danger of arcing occurring. Arcing both presents a safety hazard and adversely effects the quality of the weld. Even more beneficial results may, therefore, be obtained when means is provided for electrically isolating the saddle style support from the first pipe and the second pipe. Measures can be taken, such as placing insulation at all points in which the saddle style support comes in contact with either the first pipe or the second pipe.

With a first embodiment of alignment device constructed in accordance with the teachings of the present invention, as described above, the saddle style support includes a first support member having a pipe engaging end, a second support member having a pipe engaging end, and a clamp supporting member extending between the first support member and the second support member. The clamp supporting member has an opening extending therethrough. A first clamping member is positioned on one side of the opening. A second clamping member is positioned on an opposed side of the opening. Upon relative movement of the first clamping member and the second clamping member, after the second pipe has been extended through the opening, securely clamps the second pipe in a fixed position relative to the first pipe.

Although beneficial results may be obtained through the first embodiment, as described above, having the opening positioned between the first support member and the second support member is not practical when welding must be performed at a bend or elbow in the first pipe. Even more beneficial results may, therefore, be obtained when at least one cantilever support arm extends from the saddle style support. A clamp supporting member is mounted to the at least one cantilever support arm. An opening extends through the clamp supporting member, with a first clamping member positioned on one side of the opening and a second clamping member positioned on an opposed side of the opening, as described above.

Although beneficial results may be obtained through the use of the alignment device, as described above, the saddle style support will fall off if placed on the underside of a horizontally extending pipe or if placed on a vertically extending pipe. Similarly, if the cantilevered support arm is heavily loaded, such heavy load can cause stability problems with the saddle style support. Even more beneficial results may, therefore, be obtained when cinch means are provided for better securing the saddle style support to the first pipe upon which the saddle style support rests.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
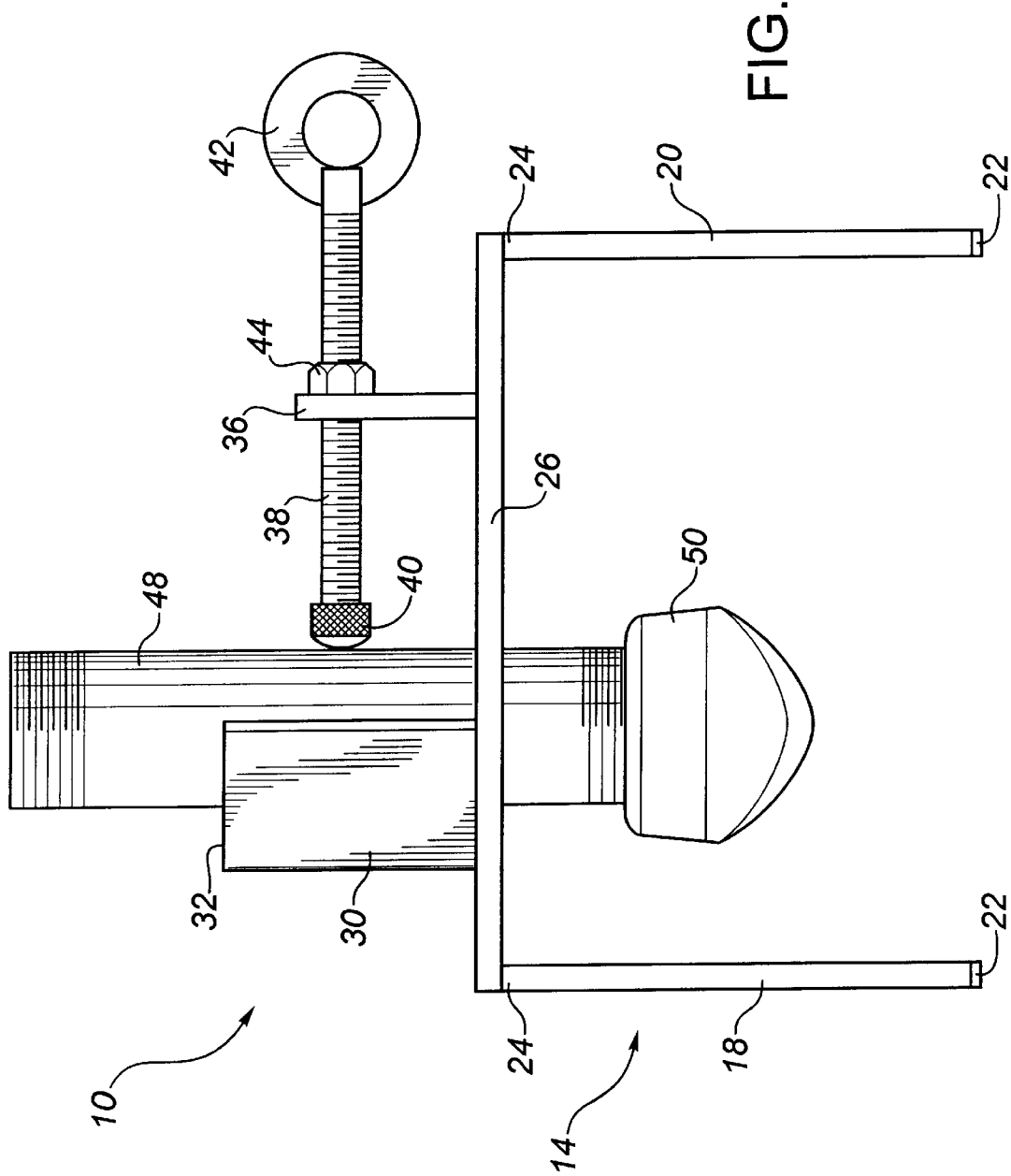
FIG. 1 is a side elevation view of a first embodiment of alignment device constructed in accordance with the teachings of the present invention.
Figure 4:
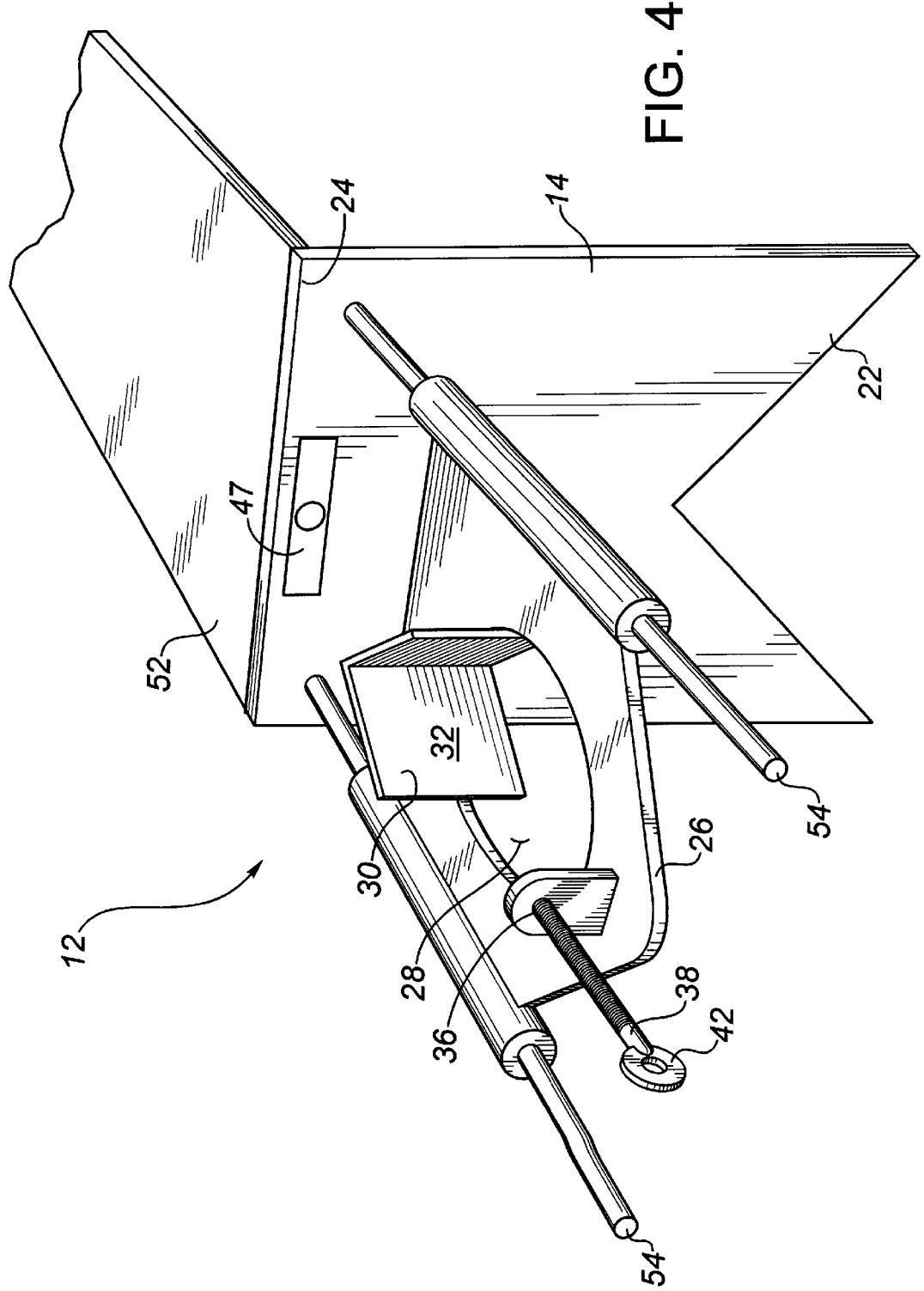
FIG. 4 is a perspective view of a second embodiment of alignment device constructed in accordance with the teachings of the present invention.
Figure 5:
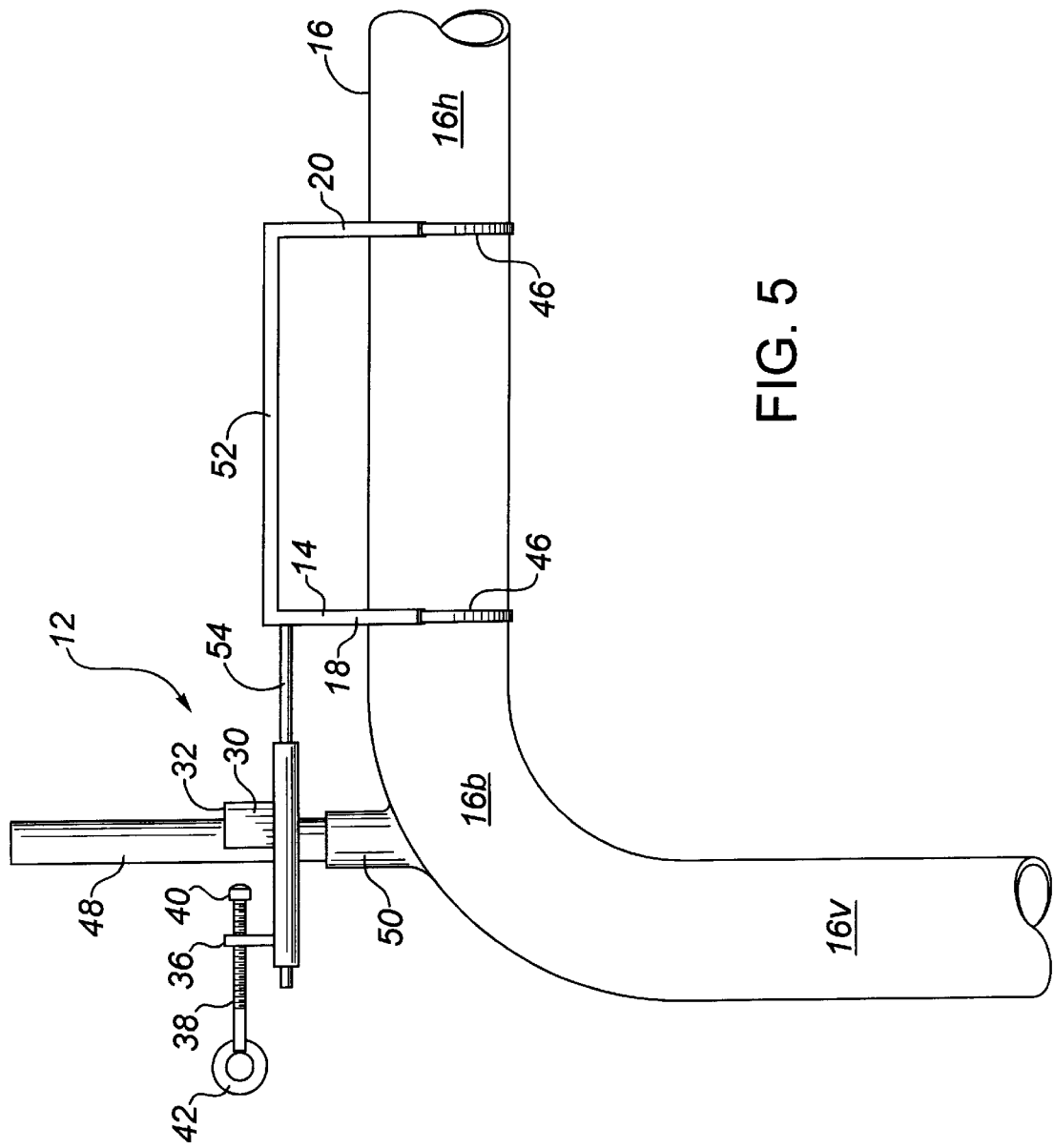
FIG. 5 is a side elevation view of the second embodiment of alignment device illustrated in FIG. 1.

Two preferred embodiments of alignment device for use in welding will now be described. Referring to FIGS. 1 through 3, a first embodiment of alignment device, generally identified by reference numeral 10 is illustrated. Referring to FIGS. 4 and 5, a second embodiment of alignment device, generally identified by reference numeral 12 is illustrated.

Figure 2:
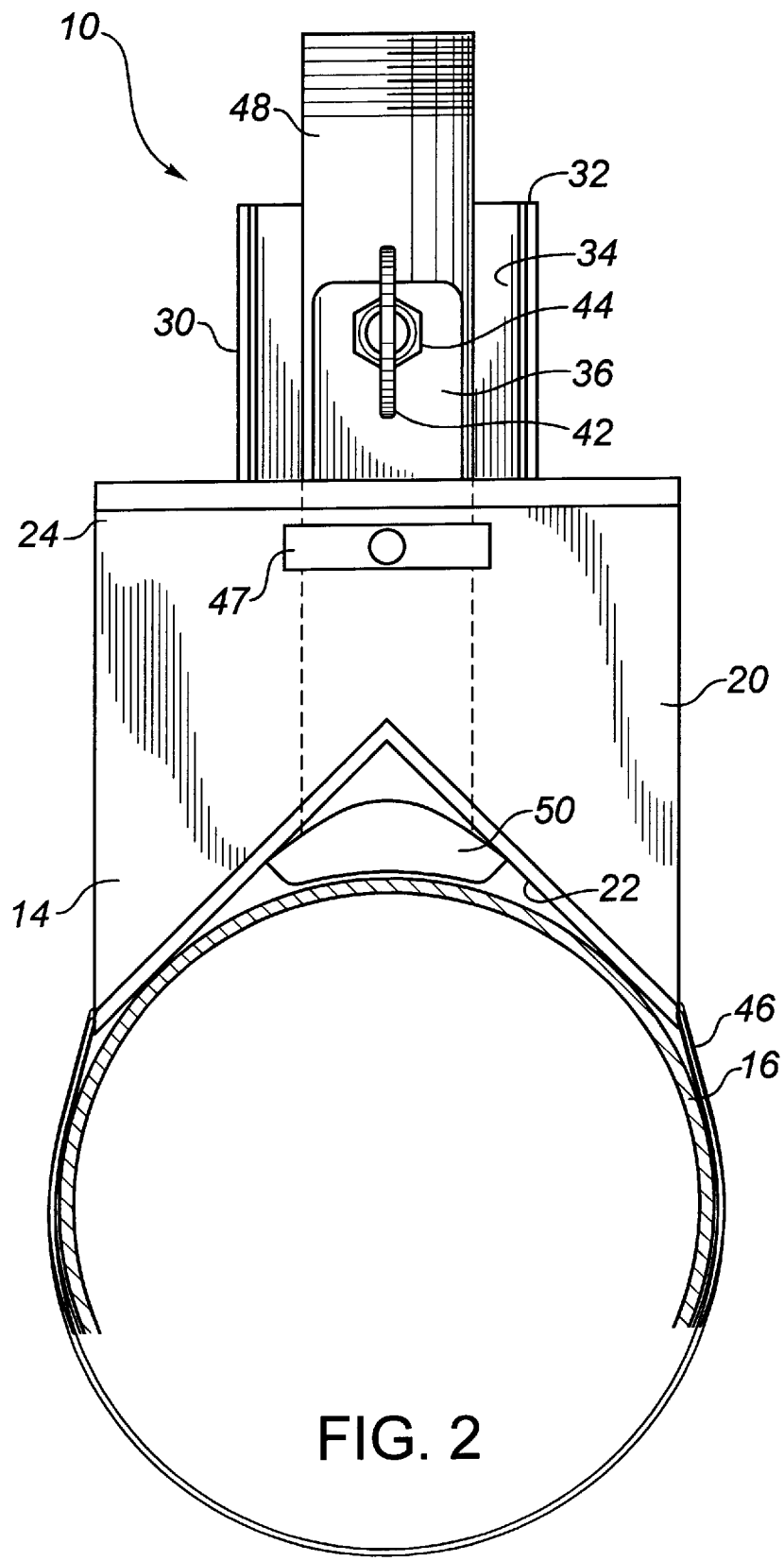
FIG. 2 is an end elevation view of the first embodiment of alignment device illustrated in FIG. 1.
Figure 3:
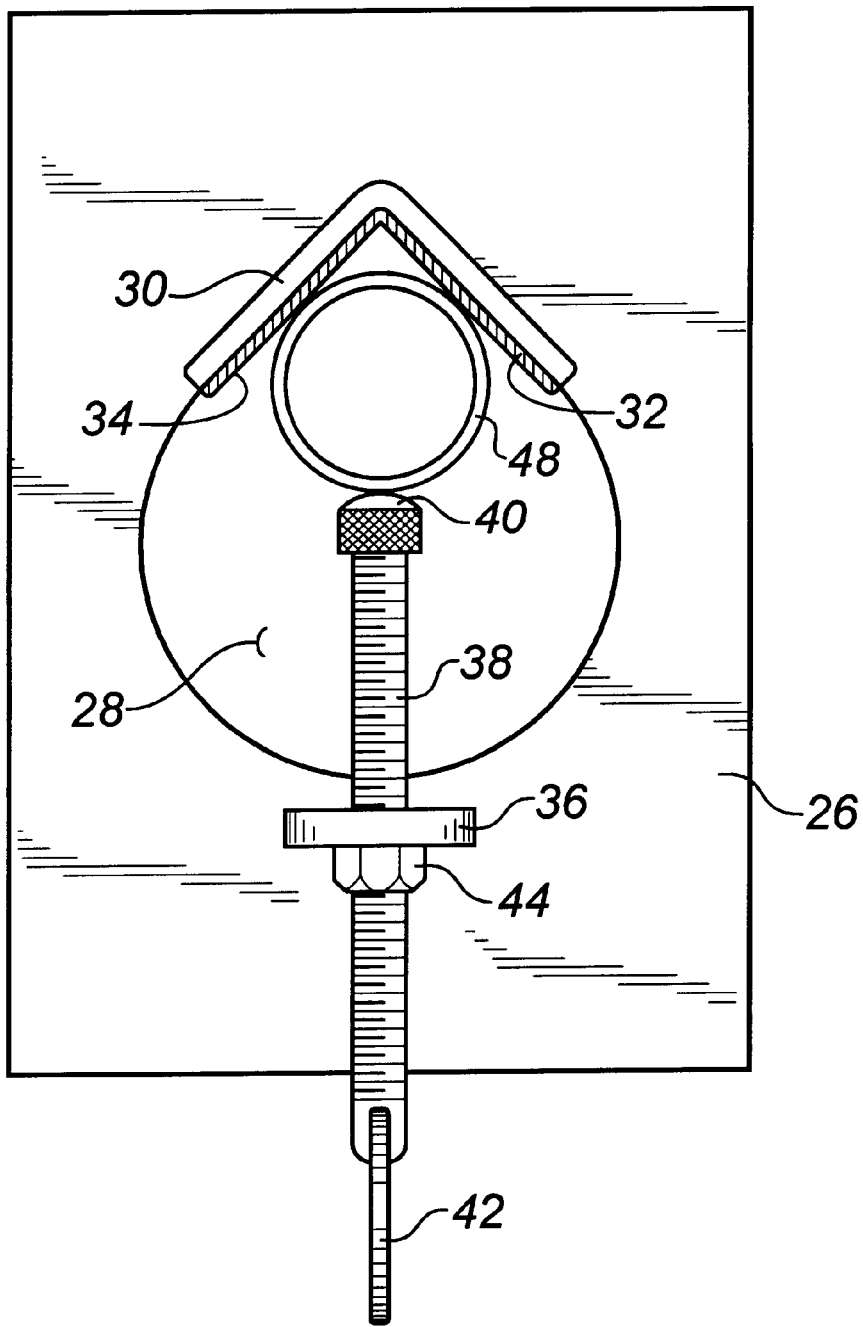
FIG. 3 is a top plan view of the first embodiment of alignment device illustrated in FIG. 1.

Referring to FIG. 2, alignment device 10 includes a pipe engaging saddle style support 14. Saddle style support 14 is capable of resting upon a curved workpiece identified as first pipe 16, in the same manner that a saddle rests upon a horse. Referring to FIG. 1, saddle style support 14 includes a first support member 18 and a second support member 20. Both first support member 18 and second support member 20 have an insulated pipe engaging end 22 and a remote end 24. Referring to FIG. 2, pipe engaging end 22 has a profile which enables it to rest upon first pipe 16. In the illustrated embodiment that profile is an inverted "V" shape. Referring to FIG. 1, a clamp supporting member 26 extends between remote end 24 of first support member 18 and remote end 24 of second support member 20. Referring to FIG. 3, clamp supporting member 26 has an opening 28 extending therethrough. A first clamping member 30 is provided in the form of a channel 32 fixed along one side of opening 28 in an orientation substantially perpendicular to first pipe 16 upon which saddle style support 14 rests. Channel 32 has a layer of insulation 34 for the purpose of electrically isolating first clamping member 30. A second clamping member 36 is positioned on an opposed side of opening 28 from first clamping member 30. Second clamping member 36 includes a movable pressure member 38 with an insulated contact tip 40. Referring to FIG. 1, movable pressure member 38 is in the form of a screw and is moved by using finger grip 42 to turn movable pressure member 38 so that pressure member 38 moves relative to a fixed supporting nut 44. Referring to FIG. 3, cinch straps 46 are provided for better securing saddle style support 14 to first pipe 16 upon which saddle style support 14 rests. It is preferred that cinch straps 46 be made of a non-conducting material. A spirit level 47 is secured to saddle style support 14 to confirm the level positioning of saddle style support 14.

The use and operation of alignment device 10 will now be described with reference to FIGS. 1 through 3. Saddle style support 14 is placed onto first pipe 16 over an opening (not shown) in first pipe 16 to which a weldolet or elbowlet is to be welded. Spirit level 47 is used to ensure level positioning of saddle style support 14. Where the opening is in the underside of first pipe 16 or where first pipe 16 has a substantially vertical orientation, cinch straps 46 are used to maintain saddle style support 14 in position. An elongate carrier member in the form of a second pipe 48 to which a fitting, such as a weldolet 50 is attached is then inserted into opening 28 in clamp supporting member 26. Weldolets typically come with one of three types of top connections; a threadolet connection, a sockolet connection and a weldolet connection. A threadolet connection is threaded so that second pipe 48 can be threaded onto weldolet 50. Sockolet and weldolet connections are not threaded and, therefore, must be temporarily tack welded to weldolet 50. Weldolet 50 is placed in a desired position relative to first pipe 16 with a desired clearance gap in preparation for welding. Movable pressure member 38 is turned by means of finger grip 42 until insulated contact tip 40 exerts a force upon second pipe 48 to securely clamp second pipe 48 against insulated channel 32 in a fixed position which is substantially perpendicular to first pipe 16. Once welding is completed, the pressure exerted by movable pressure member 38 is released and alignment device 10 is lifted off first pipe 16.

Referring to FIGS. 4 and 5, alignment device 12 will now be described. Alignment device 12 has common components with alignment device, and such common components will be assigned the same reference numerals for the purpose of abbreviating the description of alignment device 12. In alignment device 10 clamp supporting member 26 was positioned between first support member 18 and second support member 20. In alignment device 12, clamp supporting member 26 is positioned in a different position, as will hereinafter be further described. Instead a connecting plate 52 extends between first support member 18 and second support member 20. A pair of cantilever support arms 54 extend in parallel spaced relation from saddle style support 14. Clamp supporting member 26 is mounted between and movable along cantilever support arms 54. Clamp supporting member 26 has a first clamping member 30 and a second clamping member 36 as described above in relation to alignment device 10.

The use and operation of alignment device 12 will now be described in relation to FIGS. 4 and 5. Saddle style support 14 is placed onto first pipe 16. Spirit level 47 is used to ensure level positioning of saddle style support 14. It is preferred that cinch straps 46 be used to maintain saddle style support 14 in position on first pipe 16, to guard against instability caused by an overloading of weight upon cantilever support arms 54. It is to be noted the configuration of first pipe 16 illustrated in FIG. 5; first pipe 16 curves having a substantially horizontal portion 16h and a substantially vertical portion 16v. The location requiring welding is a bend or elbow 16b. Clamp supporting member 26 is extended along cantilever support arms 54 until it is positioned over an opening (not shown) in first pipe 16 on bend 16b to which an elbowlet is to be welded. A second pipe 48 to which a weldolet 50 is attached is then inserted into opening 28 in clamp supporting member 26. Weldolet 50 is placed in a desired position relative to first pipe 16 with a desired clearance gap in preparation for welding. Movable pressure member 38 is turned by means of finger grip 42 until insulated contact tip 40 exerts a force upon second pipe 48 to securely clamp second pipe 48 against insulated channel 32 in a fixed position which is substantially perpendicular to first pipe 16. Once tack welding is completed, the pressure exerted by movable pressure member 38 is released and alignment device 12 is lifted off first pipe 16.

While it is important that some means be provide to electrically isolate first pipe 16 from second pipe 48, so that arcing does not occur, there are means that can be used other than those shown. In the preferred embodiment, the insulating layers are illustrated in the most obvious peripheral locations. The insulating layers could be positioned between components during assembly.

It will be apparent to one skilled in that art that alignment device 10 will be useful when installing nozzles or couplings to tanks. It will also be apparent to one skilled in the art that alignment device 10 will be useful with various types of welding, such as T.I.G. welding. It will also be apparent to one skilled in the art that alignment device 10 will be useful when performing delicate hot-tap welding procedures on an operating piping system. It will also be apparent to one skilled in that art that alignment device 10 will be useful when placing a fitting overhead, horizontally from a pipe or in an inverted positions. It will also be apparent to one skilled in the art that first embodiment of alignment device 10 and second embodiment of alignment device 12 may be combined into one device. This was not done in order to simplify both the description and the illustrations. It will finally be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. An alignment device for use in welding, comprising:

a pipe engaging saddle style support, whereby the support rests upon a first pipe, the saddle style support including a first support member having a pipe engaging end and a remote end, a second support member having a pipe engaging end and a remote end, and a clamp supporting member extending between the remote end of the first support member and the remote end of second support member, the clamp supporting member having an opening extending therethrough;

a first clamping member including an insulated channel fixed along on one side of the opening in an orientation substantially perpendicular to the first pipe upon which the saddle style support rests; and a second clamping member positioned on an opposed side of the opening from the first clamping member, the second clamping member including a movable pressure member with an insulated contact tip, such that movement of the pressure member, the second clamping member exerts a force upon a second pipe extending through the opening to securely clamp said second pipe against within the channel of the first clamping member in a fixed position perpendicular to the first pipe.

2. The alignment device as defined in claim 1, wherein level indicator means are built into the saddle style support.

3. The alignment device as defined in claim 2, wherein the level indicator means include a spirit level.

4. The alignment device as defined in claim 1, wherein the pipe engaging end of the first support member and the pipe engaging end of the second support member both being electrically insulated.

5. The alignment device as defined in claim 1, wherein cinch straps are provided for better securing the saddle style support to the first pipe upon which the saddle style support rests.

6. An alignment device for use in welding, comprising:

a pipe engaging saddle style support, whereby the support rests upon a first pipe;

a pair of cantilever support arms in parallel spaced relation extending from the saddle style support;

a clamp supporting member mounted between and movable along the pair of cantilever support arms, the clamp supporting member having an opening extending therethrough;

a first clamping member including an insulated channel fixed along on one side of the opening in an orientation substantially perpendicular to the first pipe upon which the saddle style support rests; and a second clamping member positioned on an opposed side of the opening from the first clamping member, the second clamping member including a movable pressure member with an insulated contact tip, such that upon movement of the pressure member, the second clamping member exerts a force upon a second pipe extending through the opening to securely clamp said second pipe within the channel of the first clamping member.

* * * * *